Nov. 19, 1963 — M. R. SCHROEDER — 3,111,186
AUTOMATIC MEASUREMENT OF REVERBERATION TIME
Filed July 17, 1959 — 3 Sheets-Sheet 1

INVENTOR
M. R. SCHROEDER
BY A. E. Hirsch Jr.
ATTORNEY

Nov. 19, 1963     M. R. SCHROEDER     3,111,186
AUTOMATIC MEASUREMENT OF REVERBERATION TIME
Filed July 17, 1959     3 Sheets-Sheet 3

INVENTOR
M. R. SCHROEDER
BY G. E. Hirsch Jr.
ATTORNEY

United States Patent Office 3,111,186
Patented Nov. 19, 1963

3,111,186
AUTOMATIC MEASUREMENT OF
REVERBERATION TIME
Manfred R. Schroeder, Murray Hill, N.J., assignor to Bell
Telephone Laboratories, Incorporated, New York,
N.Y., a corporation of New York
Filed July 17, 1959, Ser. No. 827,814
20 Claims. (Cl. 181—.5)

This invention relates generally to measuring systems and more particularly to apparatus and methods for determining the acoustic condition of enclosed or open spaces. Its principal object is to provide a precision method of, and apparatus for, automatically measuring the condition known to acousticians as the reverberation time of an open or closed space.

The reverberation time of a chamber or the like for a particular frequency is usually defined as the interval required for an average sound energy density, which is originally in a steady state, to decay after the source is stopped to one millionth of its initial value, i.e., as the interval for it to decay 60 db. Alternatively, it is defined by the free decay of normal modes of vibration previously excited by the sound source. The reverberation time may be measured in a number of ways. One of the most widely used, the so-called decay-slope method, involves supplying the reverberant chamber with a source of random noise or other wave form with the desired spectrum at a relatively high intensity level, abruptly de-energizing the sound source and plotting a curve of the sound level decay as a function of time. The slope, for example the initial slope, of the curve provides at its intersection with a level of 60 db below the steady state level a direct indication of the reverberation time of the chamber. However, interference of room reasonances, lack of diffusion of the sound field, and other physical properties of the room, together with the random distribution of amplitudes in the noise source make it virtually impossible to establish accurately one unequivocal slope for the curve. Indeed, successive decay-slope measurements made under the same room conditions and with the same equipment often differ so greatly from one another that the average of a large number of tests must be used as the working figure. The measurement of reverberation time in terms of other prescribed slopes and combinations of slopes has also been suggested in an attempt to avoid these difficulties. Similarly, other methods employing, for example, a source of warbled sound to reduce the effects of standing wave systems in the room and a cathode ray oscillograph with a persistent image screen have been used to enable decay curves to be matched to locally generated exponential decays as a reference.

In all events, the final determination of reverberation time is dependent in large measure on the method used and on the experience and ability of the operator in interpreting the collected data. The many definitions of reverberation time resulting from the many methods used to measure it inevitably lead to confusion by making the term "reverberation time" an arbitrary one.

In accordance with the present invention this arbitrariness is avoided by defining precisely the reverberation time of a room in a fashion that is suitable for fully automatic evaluation. Hence, all dependence on human interpretations of accumulated data and on varying definitions is circumvented so that consistent and dependable results are quickly and easily obtained. The invention turns to account the unique relationship which has been found to exist between the reverberation time of an open or closed space and the average change in phase difference, as frequency is varied, between a source of sound located at one point in the space and the sound pressure detected at another point. Specifically it has been determined, from an analysis of room acoustics, that the complex transmission response of the reverberant field of a large room, or the like, i.e., the sound pressure at a point in the field, expressed as a function of frequency is a complex Gaussian process in the frequency domain. Thus, if all normal modes in the field have the same reverberation time, e.g., if the sound field is diffuse or, in the absence of complete diffusion, if the absorption is uniformly distributed over the walls of the room, the mean rate of phase shift, with respect to frequency, between the above-mentioned source of sound and the sound pressure is proportional to the reverberation time of the room: for a distribution of reverberation times, the mean rate of phase shift is proportional to an average reverberation time.

Further, it has been found that the mean rate of phase shift of the complex transmission response of a room is directly proportional to a particular function, known in statistical analysis as a "moment" of the curve representing the decay of sound energy with time at a point in the room after an impulsive excitation. The so-called "moments" of the curve may be characterized by defining the $n$th moment as:

$$\int_0^\infty t^n P^2(t)\,dt \qquad \text{(Defn. 1)}$$

where $t$ represents time, $P(t)$ represents the sound amplitude at a point in the room at a time $t$ after an impulsive excitation, and $n$ is any positive integer from zero to infinity. In this expression for the $n$th moment, where the sound energy density is defined as $P^2(t)$, $P(t)$ is often referred to as the impulse response of the room. Accordingly, in the present invention, the reverberation time of a room is defined as a quantity proportional to a moment of the squared impulse response of the room. Graphically, a moment of the squared impulse response represents the average slope of the phase-frequency response of a room.

The moment definition of reverberation time has a number of important advantages. First, it is unequivocal and does not depend on the degree of diffusion or the type of decay, i.e., it holds whether the decay is straight, curved, made up of two straight sections, or the like; secondly, for an exponential decay the reverberation time by the moment definition is equal in value to the reverberation time measured by other techniques or by other standard definitions and, moreover, it is subjectively more meaningful than the figure obtained by an initial slope, final slope or other method using a fixed combination of slopes. Finally, and by no means of little importance, reverberation time in terms of the moment definition can be easily measured with fully automatic equipment. Hence, all necessity for human judgment is removed from the definition and the method becomes both consistent and precise.

Both odd and even moments of the squared impulse response of a room are suitable for defining reverberation time. Preferably, however, an odd moment, as for example the first moment, is used to obtain an excellent measure of reverberation. The first moment, i.e., the center of gravity of the squared impulse response of a room, may be measured by counting the number of phase coincidences occurring between the voltage of a signal driving a loudspeaker located in a reverberant field and the voltage detected by a microphone placed in the same field. In accordance with the invention both semi-automatic and fully automatic counting apparatus are provided that permit the reverberation of a room to be rapidly evaluated over successive frequency ranges. As is the usual practice, a measure of reverberation time for contiguous octave or third octave ranges of frequency may be obtained and together read as a measure of the over-all acoustic condition of the room. For measurements involving only exponential decays or decays nearly exponential, the reverberation time can additionally be defined in terms of higher odd moments of the squared impulse response.

Even moments of the squared impulse response provide a measure of reverberation time that is substantially equal to the measure by an odd moment definition for exponential decays, and nearly equal to it for non-exponential decays. The relative ease in evaluation of even moments, in particular the second moment, make them particularly attractive as a measure of reverberation time.

It may sometimes happen that the distribution of reverberation times is too broad for the various proportionalities outlined above to hold exactly. This may occur, for example, in small rooms at low frequencies. However, unambiguous measurement of reverberation time has always been a great problem in such cases. With the phase method of measurement, according to the present invention, the ambiguity under this condition is at least no worse and by resort to mathematical corrections can be made considerably better than that of other methods.

The invention will be fully apprehended from the following descriptions of illustrative embodiments thereof taken in conjunction with the appended drawings in which.

Before entering upon a detailed description of the apparatus of the invention and of the fashion in which it operates, it is desirable to discuss certain mathematical relations, some of which are instrumented by the apparatus shown in the drawings.

Analytical Foundations

In a large enclosed field or reverberant chamber, many normal modes of transmission are generally simultaneously present giving rise to what is termed the reverberation characteristic of the field. In particular many normal modes may be excited simultaneously and thereafter supported with comparable strength at frequencies.

$$f_0 \text{ (c.p.s.)} > 4000 \sqrt{\frac{T}{V}} \qquad (1)$$

where $T$ is the reverberation time of the room in seconds and $V$ is its volume in cubic meters. The complex sound pressure $p$ at a given point in a field as a function of a frequency that is largely the standard of Equation 1 may be expressed in terms of its amplitude and its phase by $$p(f) = |p(f)| e^{-i\varphi(f)} \qquad (2)$$

where $|p(f)|$ represents the absolute amplitude of the pressure and $\varphi(f)$ represents the lag in phase between the sound pressure at the given point and the source of sound energy at another point. Phase in a lagging condition results from the minus sign in the expression and is employed for mathematical convenience in what follows.

Now, the complex amplitude $p(f)$ may also be expressed as the sum of its real and imaginary parts;

$$p(f) = s(f) + i\hat{s}(f) \qquad (3)$$

where $s(f)$ is the real part of $p(f)$ and $i\hat{s}(f)$ is its imaginary part. Both $s(f)$ and $\hat{s}(f)$ are real functions of frequency and $\hat{s}(f)$ is the Hilbert transform of the function $s(f)$, i.e., its spectrum equals $\pm i$ times the spectrum of the signal for finite frequencies. The transform leaves the amplitude spectrum of the function invariant, but changes its phase at all arguments by an equal amount, namely $$\frac{\pi}{2}$$

Similarly, the real part of $p(f)$ can be written $$s(f) = |p(f)| \cos \varphi(f) \qquad (4)$$

the quadrature part can be written $$\hat{s}(f) = -|p(f)| \sin \varphi(f) \qquad (5)$$

and the angle $\varphi(f)$ may be written as $$\varphi(f) = \arctan \frac{-\hat{s}(f)}{s(f)} \qquad (6)$$

Using the same notation, the absolute value of the sound pressure becomes $$|p(f)| = \sqrt{s^2 + \hat{s}^2} \qquad (7)$$

and its squared absolute value is $$|p(f)|^2 = s^2 + \hat{s}^2 \qquad (8)$$

Evidently then, the means square sound pressure at a point in the room is $$\overline{|p(f)|^2} = \overline{s^2 + \hat{s}^2} \qquad (9)$$

where the superposed bar denotes the frequency average. By Parseval's theorem, this may be written in the time domain:

$$\overline{|p(f)|^2} = 4 \int_0^\infty |S(t)|^2 dt \qquad (10)$$

Here, the integrand is the absolute squared Fourier transform of $s(f)$.

Consider now the instantaneous radian frequency of the complex process $p(f)$; it is defined as the first derivative of the angle $\varphi(f)$ with respect to the frequency $(f)$, i.e., as $$\frac{d\varphi(f)}{df}$$

written for convenience as $\varphi'$. From Equation 6 above it is evident that $$\varphi' = \frac{d\varphi(f)}{df} = \frac{s'\hat{s} - s\hat{s}'}{s^2 + \hat{s}^2} \qquad (11)$$

where $s$ and $\hat{s}$ denote $s(f)$ and $\hat{s}(f)$, respectively, and $s'$ and $\hat{s}'$ denote the derivatives of these functions. Averaging over time one obtains from Equation 11

$$\overline{\varphi'} = \overline{\frac{s'\hat{s} - s\hat{s}'}{(s^2 + \hat{s}^2)}} \qquad (12)$$

Now, it can be shown that $|p(f)|^2$ and $\varphi'$ are uncorrelated, so that the mean product of the values of the two functions is equal to the product of their mean values, i.e.

$$\overline{|p(f)|^2 \cdot \varphi'} = \overline{|p(f)|^2} \cdot \overline{\varphi'} \qquad (13)$$

and thus, $$\overline{\varphi'} = \frac{\overline{|p(f)|^2 \cdot \varphi'}}{\overline{|p(f)|^2}} \qquad (14)$$

Hence, from Equations 9 and 12, the product of the mean squared sound pressure and the averaged first derivative of the angle $\varphi(f)$, i.e., the numerator of Equation 14, becomes $$\overline{|p(f)|^2 \cdot \varphi'} = \overline{s'\hat{s} - s\hat{s}'} \qquad (15)$$

By applying Parseval's theorem, this product may also be expressed as follows:

$$\overline{|p(f)|^2 \cdot \varphi'} = 8\pi \int_0^\infty t|S(t)|^2 dt \qquad (16)$$

Utilizing Equations 16, 10 and 14 we have $$\overline{\varphi'} = 2\pi \frac{\int_0^\infty t|S(t)|^2 dt}{\int_0^\infty |S(t)|^2 dt} \qquad (17)$$

where the quotient evidently is a definition in the time domain of the first moment of $S|(t)|^2$.

In a simple linear system the complex sound pressure $p(f)$ and the impulse response of the room $P(t)$ are Fourier transform pairs. For positive times the Fourier transform of the complex sound pressure $P(t)$ is equal to twice the Fourier transform of the real part $S(t)$ alone. Hence, for values of $t>0$, $P(t) = 2S(t)$, and $S(t)$ may be replaced in Equation 17 by $P(t)$ to yield $$\overline{\varphi'} = 2\pi \frac{\int_0^\infty t P(t)^2 dt}{\int_0^\infty P(t)^2 dt} \qquad (18)$$

wherein the quotient is equivalent to the normalized first moment $\bar{t}$ of the squared impulse response.

We thus find that the mean rate of phase shift, with respect to frequency, of the complex sound pressure in the room is equal to $2\pi$ times the normalized first moment of the squared impulse response $$\overline{\frac{d\varphi}{df}} = \overline{\varphi'} = 2\pi \bar{t} \qquad (19)$$

Considering the squared impulse response, if the decay of sound energy is an exponential one, i.e., if $$P^2(t) = e^{-\frac{t}{\tau}} \qquad (20)$$

where $\tau$ represents the interval in seconds for the intensity of the sound to reach a value $1/e$ of its initial value, then from Equation 18

$$\bar{t} = \tau$$

and (19) reduces to $$\overline{\varphi'} = 2\pi\tau \qquad (21)$$

which is identical with the differential phase lag for a single delay $\tau$.

Since room acousticians define reverberation time by a 60 db decay, we have from Equation 20

$$T = 6\ln 10 \cdot \tau = 13.8\tau \qquad (22)$$

and from (21) we then find that $$T = \frac{3}{\pi} \ln 10 \overline{\varphi'} = 2.2 \overline{\varphi'} \qquad (23)$$

where ln denotes a logarithm to the Naperian base.

That is to say, the reverberation time of the room over a given frequency interval $\Delta f$ is related to the mean rate of phase shift, with respect to frequency, of the sound pressure at a point in the room. It is in accordance with the present invention to determine the reverberation time of a room by measuring this quantity.

*Measurement of Reverberation Time*

Figure 1:
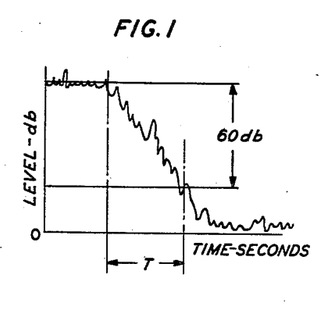
FIG. 1 is a diagram showing the typical amplitude decay of an interrupted sound in reverberant field as a function of time.

Turning now to the drawings, the problems encountered in measuring reverberation time by the decay-slope method become readily apparent from an examination of the curve shown in FIG. 1. By this method, the amplitude decay of a signal, for example, a random noise signal, injected into a reverberant field, and detected, for example, by a microphone placed in the field, is plotted against time over the interval during which the input signal is maintained at a constant high level, is abruptly stopped, and subsequently allowed to decay by an arbitrary amount, e.g., by at least 60 db. The time for the decay is measured by estimating the slope of the decay curve. Since the decay is generally irregular, a number of straight line approximations to the decay may equally well be assumed. It is for this reason the initial slope is often taken as the standard. Nevertheless, slight variations in the estimation of the slope and the exact point of intersection with the 60 db down value add to the difficulty in obtaining an exact and consistent measure of reverberation time.

In accordance with the present invention, this arbitrariness is avoided since the measurement is made by automatic means. As indicated above all that is required for the automatic measurement of the reverberation time of the room is an evaluation of the average slope of the phase-frequency characteristics of the sound pressure, which is equivalent to the first moment of its squared impulse response. As evident from FIG. 2 the phase of the sound pressure varies in a somewhat random fashion as a function of frequency; it generally increases with frequency and follows an average increasing slope. A preferred method for measuring the average slope of the curve makes use of a zero counting technique and the relations set forth above.

From Equation 6 the agle $\varphi(f)$ is an angle whose tagent is the ratio of $-\hat{s}(f)$ and $s(f)$. The average value of the derivative with respect to frequency of the angle, $\overline{\varphi'}$, needed to evaluate T from Equation 23 can be measured by plotting the average values of $s(f)$ and $\hat{s}(f)$ simultaneously on two orthogonal axes as, for example, on a cathode ray oscilloscope screen, measuring the total angular displacement $\Delta\varphi$ of the resulting vector as the frequency is varied over a frequency interval $\Delta f$, and determining the quotient $$\frac{\Delta\varphi}{\Delta f}$$

Figure 3:
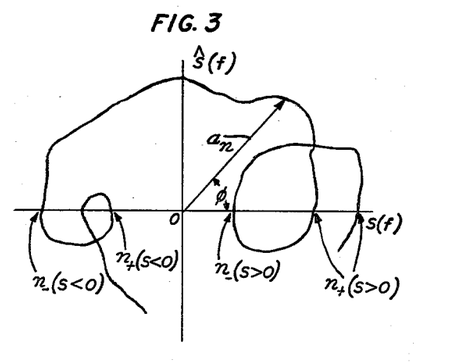
FIG. 3 is a vector diagram of assistance in explaining certain features of the invention.

A vector diagram illustrating such a plot is shown in FIG. 3. Here values of the signal $$s(f) = a_n \cos\varphi(f) \qquad (24)$$

are plotted along the abscissa and values of the signal $$\hat{s}(f) = -a_n \sin\varphi(f) \qquad (25)$$

are plotted along the ordinate. The resulting vector represents the instantaneous amplitude $a_n$ and phase $\varphi$ of the function $p(f)$. The rate, with respect to frequency, of positive or negative crossings of the vector with the positive $s(f)$ axis is then a measure of the average value derivative of the phase angle, i.e., of $\overline{\varphi'}$. The total angular displacement of the vector as the frequency is varied is a measure of the change in the phase lag for the particular frequency increment. If the frequency increment is known, then the change in the phase lag is sufficient to establish a value of $\overline{\varphi'}$, and by Equation 23, the value of the reverberation time of the room. With the coordinates as shown in FIG. 3, an increase in frequency causes the vector to rotate in the counterclockwise or increasing phase lag (positive) direction. The locus of its tip, which appears as a luminous dot on the oscillograph screen, follows the solid line path shown in the drawing. The change in the phase lag is determined by measuring the total angular displacement of the vector tip as it rotates about the origin. Conveniently, this is done by visually counting the number of times that the spot crosses the positive $s(f)$ axis in the positive direction, i.e., counterclockwise, since, for constantly increasing phase lag, successive crossings are equivalent to an angular change of $2\pi$ radians.

Inasmuch as the phase response of most fields is not monotonic, the positive and negative going crossings of the axis must be noted in order to discount loops in the locus. Calling the rate of positive or negative crossings with the positive $s(f)$ axis $n_+(s>0)$ or $n_-(s>0)$ respectively, it follows that for a given frequency interval $\Delta f$ $$\overline{\varphi'} = 2\pi[n_+(s>0) - n_-(s>0)] \quad (26)$$

Since Equation 26 is defined in terms of a rate of axis crossings, it may be noted that $n_+(s>0)$ equals the number of positive crossings of the positive $s(f)$ axis divided by the frequency interval $\Delta f$, and $n_-(s>0)$ equals the number of negative crossings of the positive $s(f)$ axis divided by the frequency interval. That is to say, the total phase change is equal to the number of positive axis crossings of the vector tip, discounted by negative loop returns, as the frequency is varied. This expression may be written in a more convenient fashion by observing that $$n_-(s>0) = n_+(s<0) \quad (27)$$

so that $$\overline{\varphi'} = 2\pi[n_+(s>0) - n_+(s<0)] \quad (28)$$

From (19) it then becomes evident that $$\bar{t} = n_+(s>0) - n_+(s<0) \quad (29)$$

When an automatic counter is used to record positive axis crossings, negative going crossings must also be taken into account. Hence, negative crossings of the positive $s(f)$ axis and positive crossings of the negative $s(f)$ axis are also counted and automatically subtracted. Two counters may be used to perform the required operations; one to aid in the determination of the rate, with respect to frequency, of all counterclockwise crossings (positive), i.e., $$n_+(s>0) + n_-(s<0) = 2n_+ \quad (30)$$

and the other to aid in the determination of the rate, with respect to frequency, of counterclockwise negative crossings $$n_-(s>0) + n_+(s<0) = 2n_- \quad (31)$$

The average slope of the phase-frequency response of the room, i.e., the first moment, is thus measured by counting phase coincidences between the loudspeaker and the microphone voltages. Call the rate of phase coincidences per cycle per second $n_+(n_-)$ when the phase lag is increasing (decreasing) with increasing frequency the reverberation time of the field becomes $$T = 13.8(n_+ - n_-) \quad (32)$$

where 13.8 represents the approximate value for 6 ln 10.

In order to increase the accuracy of measurement it is also practical to determine the rate of ordinate crossings, i.e., the rate of crossings of the $\bar{s}(f)$ axis. If desired, the error may be still further reduced by resort to additional measuring points, e.g., additional axes through the same origin. The change in the phase lag can also be measured, of course, by means of a conventional phase meter or detector. However, the transient response of most instruments of this sort is such as to give rise to spurious readings at least for an inexperienced operator. Moreover, the difficulty in reading such instruments makes it preferable from the practical standpoint to rely on the oscillograph method or automatic counting methods previously described.

Apparatus

Figure 4:
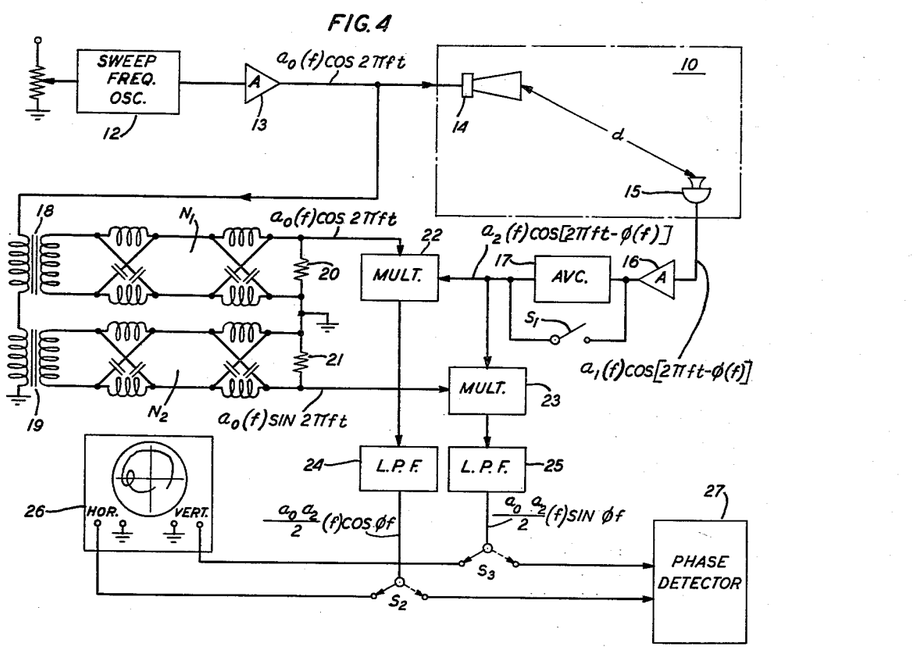
FIG. 4 is a schematic block diagram showing apparatus for measuring the reverberation time of a reverberant field in accordance with the invention.

Referring now to the apparatus which turns these considerations to account, FIG. 4 shows a system for measuring the reverberation time of a field in the reverberant chamber 10 by the instrumentation of Equations 8 and 23. A signal in the audible frequency range produced, for example, by sweep frequency oscillator 12 is passed through an amplifier 13 to a transducer 14, e.g., a loudspeaker, located inside the chamber 10. The frequency of oscillation is selected by appropriate adjustment of the oscillator. Preferably, the oscillator is calibrated to indicate octave or third octave ranges, although this is, of course, a refinement. The amplifier 13 serves merely to adjust the oscillator signal amplitude to a suitable level for operation of the remainder of the apparatus. The output of the amplifier thus may be designated $a_0 \cos 2\pi ft$ where $a_0$ represents its instantaneous amplitude, and $f$ designates the frequency of oscillation, which may be varied over a range of frequencies $\Delta f$.

Sound produced in the room 10 by loudspeaker 14 is picked up by a transducer 15 which may be a microphone placed in the room. To insure a high effective reverberation ratio in a steady state room condition, the distance $d$ between the loudspeaker and the microphone should be sufficiently large that the energy density of the direct wave is small as compared with the sum of the re-flected waves, i.e., $d[m] > 0.05$ $$d[m] > 0.05 \sqrt{\frac{V\,[m^3]}{T\,[\sec.]}}$$

where V is the volume of the room in cubic meters. Additionally, the oscillator frequency should be varied so that the room follows and remains in a steady state condition. Generally a sweep rate not exceeding several cycles per second is satisfactory to maintain a steady state condition; the sweep may be produced either by automatic means or by suitable manual adjustment of oscillator 12.

Energy picked up by microphone 15 is amplified in amplifier 16 and if desired passed through an automatic volume control circuit 17, which may be of any type well known in the art. The automatic volume control circuit is desirable to limit the over-all dynamic range so that the remainder of the equipment in the circuit need not have such a wide dynamic range. Since sound generally reaches the microphone 15 by multiple paths, at some instants near cancellation occurs, and at others reinforcement gives rise to very high level sounds, e.g., 40 db fluctuations are common. The AVC circuit limits the excursions, for example, to approximately 10 db. A switch, $S_1$, is provided to remove the circuit 17 from the circuit, if desired; for example, under the conditions to be explained hereinafter.

The amplified sound wave emanating from amplifier 16 is a wave of the same frequency as the one supplied to loud-speaker 14 but normally has a somewhat different amplitude and phase. It may be designated $a_1(f) \cos(2\pi ft - \varphi(f))$, where $a_1$ is a function of transmission response of the room 10 and the gain of amplifier 16. After passing through the automatic volume control circuit 17, the amplitude is compressed so that the signal may be designated $a_2(f) \cos(2\pi ft - \varphi(f))$. The amplitude difference is of no concern but the phase lag $\varphi$ is utilized in the fashion discussed above to determine the reverberation time T of the room.

In order to measure the phase lag as a function of frequency, the signal developed by oscillator 12 is utilized to develop two signals whose amplitudes are the same but whose phases remain ninety degrees apart over a wide frequency band. They may be produced in a variety of ways. One suitable means employs two networks $N_1$ and $N_2$ so proportioned that while they introduce no frequency-dependent loss, any frequency component of an input wave applied in phase coincidence at their input terminals reappears at their output terminals with a phase difference of ninety degrees. As between the two networks their outputs are thus in quadrature and otherwise alike. Thus, the signal developed by amplifier 13 is passed to the primary windings of two transformers 18 and 19 to ground. The secondary winding of the upper transformer 18 is coupled to network $N_1$ and the secondary winding of the lower transformer 19 is coupled to the other network $N_2$. Network $N_1$ is terminated in a first load resistor 20 and network $N_2$ is terminated in a second load resistor 21. If, for example, a wave component $a_0$ of frequency $2\pi f$ be applied simultaneously to both these networks and if a time origin be selected such that the output of the upper network as it appears on load resistor 20 be $a_0 \cos 2\pi ft$ then the output of the network $N_2$ as it appears across the load resistor 21 is $a_0 \sin 2\pi ft$. In other words, the attenuation-frequency characteristics of these two networks are flat throughout a frequency range of interest and their phase characteristics are such that, for a given input signal, their outputs are in time quadrature. Networks having these properties are well known and are described, for example, by S. Darlington in an article published in the Bell System Technical Journal for January 1950, volume 29, page 94.

It is a comparatively simple matter to construct the networks $N_1$ and $N_2$ to introduce such a constant phase difference of ninety degrees over a frequency range of interest provided no further restriction is placed on the phase-frequency characteristic of either network. For the purposes of the present invention, the phase shift imparted to the signals in passing through the networks can be neglected in the final measurement since it varies only slowly with frequency and is closely equal for the two networks.

The outputs of the networks $N_1$ and $N_2$ may be additionally amplified, if desired, and applied independently to the input points of multipliers 22 and 23. The sound wave developed in the microphone channel and available at the output of the automatic volume control circuit 17 is applied to the other input of both of the multipliers 22 and 23. Hence, the output of the multiplier 22 is the product of the delayed microphone voltage, $a_2(f) \cos(2\pi ft - \varphi(f))$, and an undelayed component of the wave from amplifier 13, $a_0 \cos 2\pi ft$. Similarly, the output of multiplier 23 is the product of the microphone voltage and an undelayed component of the wave from amplifier 13, but one which is in quadrature with the one applied to multiplier 22, i.e., $a_0 \sin 2\pi ft$.

A large number of mechanisms and devices are available for carrying out the operation of multiplying one input signal by another input signal to produce an output signal proportional to their product. Some of these devices are described by S. A. Davis in an article published in Control Engineering for November 1954, volume 1, page 36.

The individual outputs of the two multipliers are passed through low pass filters 24 and 25 which operate to smooth or average the applied waves. The elements may be of well-known construction and the pass band of each should be sufficiently narrow to eliminate the double frequency components produced in the multipliers. A cut-off frequency on the order of ten cycles per second has been found to be satisfactory.

By a trigonometric identity, the averaged product signal derived from filter 24 may be written $$\frac{a_0 a_2}{2} \cos \varphi(f)$$

and the averaged product of the signals derived from filter 25 becomes $$\frac{a_0 a_2}{2} \sin \varphi(f)$$

From Equations (4) and (5), it is thus evident that the waves from filters 24 and 25 correspond to signals proportional, by an equal constant, to $s(f)$ and $\hat{s}(f)$, respectively.

With the switches $S_2$ and $S_3$ thrown to the positions in which they are shown, the outputs of filters 24 and 25 are applied respectively to the horizontal and vertical deflection plates of a cathode ray oscilloscope 26 or the like thus to produce on its face a luminous spot whose distance from the origin represents the amplitude of $|p(f)|$ and whose angle with the horizontal axis represents $\varphi(f)$. As the frequency of oscillator 12 is varied, e.g., advanced over successive octave or third octave ranges, the locus of the vector tip, represented by the luminous spot, follows a pattern similar to that shown in FIG. 3 so that the total phase lag as a function of frequency is displayed as a continuous pattern revolving about the origin. From this figure and Equation 32, the phase response, the average rate of decay, and hence the reverberation time for specified increments of frequency is easily determined.

With the automatic volume control circuit 17 in the circuit, the locus of the vector tip will closely follow a nearly circular path. Consequently, the phase reversals of the luminous spot, falling on a previous trace on the persistent screen, may be difficult to observe. With switch $S_1$ closed, compression is removed so that the amplitude of the vector varies widely and the trace takes the form of the illustration in FIG. 3, one that is somewhat easier to interpret.

With the switches $S_2$ and $S_3$ thrown to the positions indicated by the broken lines, the outputs of filters 24 and 25 are applied to an automatic phase detector 27, or the like, which may take any form well known in the art. Preferably detector 27 employs a circuit for counting pulses corresponding to selected axis crossings in accordance with the analytical development of Equations 27 through 32. Apparatus for instrumenting these equations is described below in connection with the apparatus of FIG. 5. If desired, both the visual indication afforded by the oscilloscope display and an automatic phase measuring instrument indication may be used simultaneously.

Figures 2, 5:
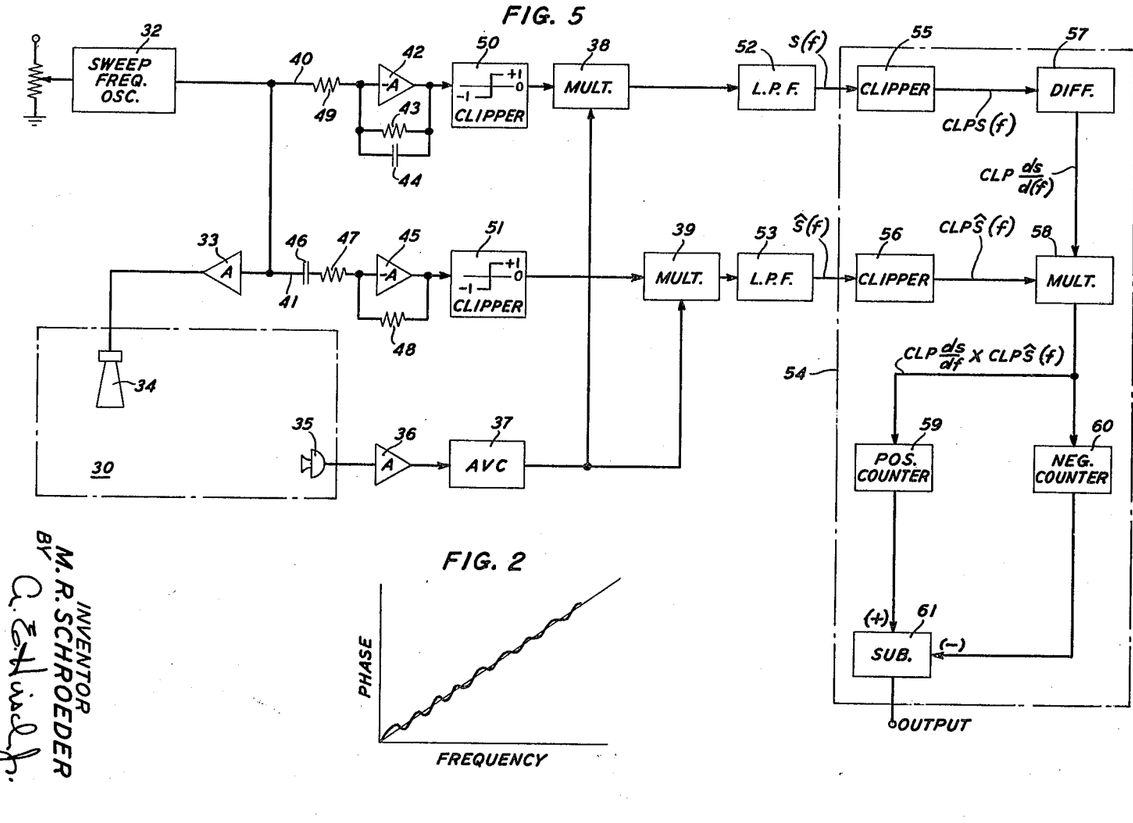
FIG. 2 is a diagram showing the phase-frequency behavior of a typical reverberant field.
FIG. 5 is a schematic block diagram showing apparatus embodying the invention and certain refinements over the apparatus of FIG. 4.

FIG. 5 shows an alternative to the apparatus of FIG. 4 that incorporates apparatus for automatically recording the total number of axis crossings by the vector of FIG. 3 as the frequency is varied. A test signal derived, for example, from the sweep frequency oscillator 32 is amplified in amplifier 33 and utilized to energize a loudspeaker 34 positioned in the reverberant field 30 to be measured. Once again the distance $d$ is such as to insure a high reverberation ratio, and a steady state room condition is assumed. The signal, whose phase is a function both of oscillator frequency and the room characteristics, is picked up by microphone 35, amplified in amplifier 36, and passed through an automatic volume control circuit 37, used for the same purpose as circuit 17 in the apparatus of FIG. 4, to one input of each of the multipliers 38 and 39. The signal from oscillator 32 is also applied in parallel to two paths 40 and 41 each of which includes in tandem an operational amplifier and an infinite clipper. Effectively, the operational amplifiers pass currents proportional to a nonlinear function when a voltage proportional to the function is applied thereacross. In path 40 the applied signal is passed through a high gain D.-C. amplifier 42 by way of a linear device, e.g., resistor 49. Nonlinear feedback around the amplifier is provided by the circuit comprising the parallel combination of resistor 43 and capacitor 44. The resistor 49 and the parallel combination of resistor 43 and capacitor 44 are selected to have impedances equal in magnitude but with different phase angles. Accordingly, the circuit behaves somewhat as an integrator, and its output is retarded in phase. The signal in path 41 is applied to amplifier 45 through a nonlinear circuit which is the exact inverse of the nonlinear feedback circuit around amplifier 42, i.e., it comprises a nonlinear circuit including the series combination of capacitor 46 and resistor 47. The amplifier, similar in all respects to amplifier 42, is provided with linear feedback through resistor 48. Thus the circuit behaves somewhat as a differentiator and its output is equal in magnitude to its input but advanced in phase.

By appropriately selecting the impedance of the nonlinear elements used in the circuits, and by placing the nonlinear impedances in inverse positions in the two circuits, a pair of output signals of substantially the same magnitude but separated in phase by $$\frac{\pi}{2}$$

radians are produced over a wide band of frequencies. Operational amplifiers having these properties are well known and are described, for example, in Millman and Taub, "Pulse and Digital Circuits" (McGraw-Hill, 1956) at page 25.

If desired, the signals passed by the amplifiers are individually passed through the infinite clippers 50 and 51 to produce quadrature waves whose amplitudes are greatly compressed. The operation of the infinite clippers, as indicated by their input-output characteristic, is to reduce all positive amplitudes of the input wave to a uniform positive amplitude of $+1$ and similarly to reduce all negative amplitudes of the input wave to a uniform negative amplitude of $-1$. The outputs of clippers 50 and 51 are thus clipped waves in phase quadrature with one another. Such an operation, although not generally necessary, greatly facilitates the signal multiplication which takes place in the multipliers 38 and 39.

The quadrature waves derived from clippers 50 and 51 are passed respectively to the second input terminals of the multipliers along with the microphone signals from circuit 37. The product signals when passed through low pass filters 52 and 53 represent a pair of average value signals proportional to $s(f)$ and $\hat{s}(f)$, respectively. Alternatively, the quadrature waves from amplifiers 42 and 45 may be used to energize a pair of samplers, replacing multipliers 38 and 39, to pass a number of samples of the microphone signal at two instants during each period of the excitation frequency with a phase difference of $$\frac{\pi}{2}$$

After passing through low pass filters, the outputs are once again a pair of waves equivalent to $s(f)$ and $\hat{s}(f)$.

In either case the signals $s(f)$ and $\hat{s}(f)$ may be applied as before to an oscilloscope to enable the total phase lag to be observed as a function of frequency. Preferably, however, these signals are applied to an automatic counting circuit 54 which evaluates the number of crossings of one or more selected axes thus to implement Equations 30, 31 and 32, automatically. The quadrature signals $s(f)$ and $\hat{s}(f)$ are individually passed through infinite clippers 55 and 56 which may be identical in construction with the clippers 50 and 51. The output of clipper 55, i.e., a signal which may be designated $clps(f)$, is passed through a differentiating circuit 57 to one input of a multiplying circuit 58. Each upward going discontinuity of the substantially rectangular wave from the clipper 55 thus is applied to the multiplier in the form of a positive spike and each downward going discontinuity of the wave as a negative spike, i.e., the output of differentiator 57 is the first derivative of the wave $$clps(f) \text{ or } clp\frac{ds}{df}$$

To the other input of the multiplier 58 is applied the clipped quadrature component $clp\hat{s}(f)$ so that the multiplier output is $$clp\frac{ds}{df} \cdot clp\hat{s}(f)$$

The effect of the multiplication is to pass as positive pulses all positive spikes from differentiator 57, representative of positive crossings of the positive $s(f)$ axis in the graph of FIG. 3 and all negative spikes from the differentiator representative of positive crossings of the negative $s(f)$ axis in the graph. The resulting positive train of pulses therefore represents $$n_+(\hat{s}>0) + n_-(\hat{s}<0) = 2n_+$$

and is counted by counting circuit 59 which may be of conventional construction. All negative spikes from differentiator 57, representative of negative crossings of the positive $s(f)$ axis, and positive crossings of the negative $s(f)$ axis, representing values of $$n_-(\hat{s}>0) + n_+(\hat{s}<0) = 2n_-$$

are similarly counted by a counter 60. The difference, $2(n_+ - n_-)$, is taken by applying the signals, e.g., analog signals, from the counters 59 and 60 to a subtracting circuit 61 or the like. One half of the output of the subtractor when divided by the frequency interval $\Delta f$ and multiplied by $6 \ln 10 = 13.8$, as demonstrated in Equation 32, provides an immediate measure of the reverberation time of the room 30 for the selected increment of frequency. An additional multiplier may be used, if desired, automatically to apply the constant, e.g., 6.9, to the subtractor output signal. The measurement outlined above can be rapidly made for other increments, for example, for contiguous octave or third octave ranges over the entire audible spectrum. By this means, the acoustic conditions of the room may be made rapidly and with precision.

With the implementation of the automatic counter 54 of FIG. 5, it is evident that the final measurement of phase lag is quantized, i.e., is accurate only to the nearest $\pi$ radians of lag. Ordinarily this measurement is sufficiently close to provide a computation of reverberation time within acceptable limits. However, measurement accuracy may be improved, for example, by additionally counting the rate, with respect to frequency, of positive crossings of additional axes (drawn through the origin of the graph of FIG. 3). Thus, for example, the rate of vector crossings for the positive and negative $\hat{s}(f)$ axes, that is, for values of $s(f)=0$, may be tabulated to halve the error; indeed other axes through the same origin may be used if desired.

Other Moments

As indicated previously, higher order odd moments of the squared impulse response of a sound field are also closely related to its reverberation time; hence, they may also be used to measure it. Additionally, even moments may be used to obtain a reasonably good approximation to the reverberation time; they too provide a valuation that is virtually independent of measurement ambiguities.

The first moment of the squared impulse response $\bar{t}$ in terms of the rate of axis crossings is given by Equation 29. A similar relationship for the average value of the second moment in terms of the rate, with respect to frequency, of zeroes of the in-phase component of a detected sound signal may be developed as follows:

If a reverberant field is excited with a sinusoid $\cos 2\pi ft$, the sound pressure detected at a point in the field, as for example by a microphone placed some distance $d$ from the source, has two components; one in-phase with the excitation, and one $$\frac{\pi}{2}$$

radians out-of-phase with it. This relationship can be expressed $$p(f,t) = a(f)\cos 2\pi ft + b(f)\sin 2\pi ft \quad (33)$$

where $a(f)$ denotes the in-phase component. For all modes of excitation sustained in the field of frequency $f_0$, as defined by Equation 1, $a(f)$ is a Gaussian process and the average number of zeroes, $N_0$, in the frequency interval $\Delta f$, i.e., the number of times $a(f)$ is 0, is related to the second moment of the absolute squared Fourier transform of $a(f)$ as follows:

$$\frac{N_0}{2\Delta f} = \sqrt{\frac{\int_0^\infty t^2 |A(t)|^2 dt}{\int_0^\infty |A(t)|^2 dt}} \quad (34)$$

where the radicand is a definition of the second moment of $|A(t)|^2$, and $A(t)$ is the Fourier transform of $a(f)$;

$$A(t) = \int_0^\infty a(f) e^{i2\pi ft} d(f) \qquad (35)$$

A proof of Equation 34 may be found in an article by S. O. Rice published in the Bell System Technical Journal for July, 1944 (vol. 23 at page 282).

Apart from a factor of one half, $A(t)$ is equal to the impulse response $P(t)$ of the room for positive times $$A(t) = \tfrac{1}{2} P(t) \quad (t > 0) \qquad (36)$$

Substituting (36) into (34) gives $$\frac{N_0}{2\Delta f} = \sqrt{\frac{\int_0^\infty t^2 P^2(t) dt}{\int_0^\infty P^2(t) dt}} \qquad (37)$$

Here the absolute sign is omitted because $P(t)$ is always real.

Assuming now an exponential signal response $$P(t) = e^{-6.9 \frac{t}{T}} \qquad (38)$$

where T is the time in seconds for a 60 db decay, one obtains by inserting (38) into (37):

$$\frac{N_0}{2\Delta f} = \sqrt{2 \left( \frac{T}{13.8} \right)^2}$$

Solving this equation for T, an expression for the reverberation time of the room is obtained in terms of the average number of zeroes in the frequency interval $\Delta f$, as follows:

$$T_2 = \frac{13.8}{2\sqrt{2}} \frac{N_0}{\Delta f} = 4.9 \frac{N_0}{\Delta f} \qquad (39)$$

The subscript "2" on T is used to denote that the reverberation time $T_2$ is based on a second moment definition.

For exponential decays, the value of reverberation time based on an even moment definition, e.g., the second moment as by Equation 39, is closely equal to the value obtained by an odd moment definition, e.g., the first moment as by Equation 32. For non-exponential decays, the different definitions result in slightly different values. Hence, in some instances, the reverberation time $T_2$ will differ somewhat from the time $T_1$ (measured by the first moment definition), but in all cases it has been found that the second moment value is a close and useful approximation.

Figure 6:
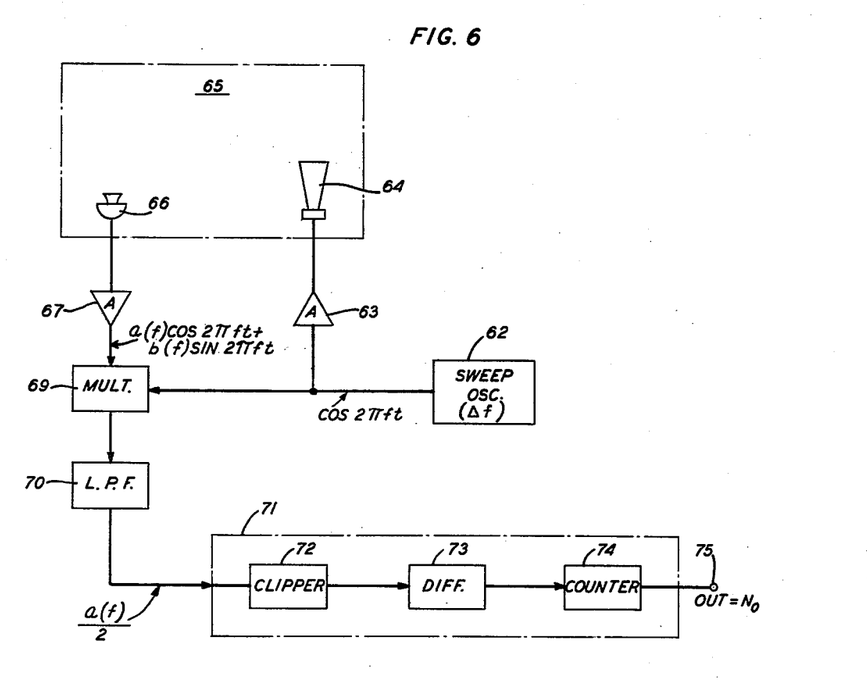
FIG. 6 is a schematic block diagram showing apparatus for measuring the reverberation time of a room in accordance with another aspect of the invention.

FIG. 6 shows apparatus arranged to evaluate the second moment of the squared impulse response of a sound field in terms of the average number of zeroes, $N_0$, of $a(f)$ in the frequency interval $\Delta f$, thus to implement Equation 39. Signals in the audible frequency range and designated for convenience as being of the form $\cos 2\pi ft$ are derived from signal generator 62 as it is swept over the frequency range $\Delta f$, typically an octave range. The signals are amplified, if desired, in amplifier 63 and applied to a loudspeaker 64 positioned inside the room 65. Microphone 66, also located in the room, responds to the resulting sound energy to produce a wave similar to that produced by oscillator 62 but delayed from it in phase by an amount proportional to the acoustic condition of the field of room 65. The delayed signal, which may be amplified in amplifier 67 if necessary, has a wave form which may be mathematically expressed as the sum of two quadrature components; i.e., in the form of Equation 33. It is applied to one input terminal of multiplier 69; the wave emanating from oscillator 62 is applied to the other. As the frequency of the oscillator is varied over the range $\Delta f$, the output of multiplier 69 is thus a wave proportional to the product of the oscillator wave and the delayed wave from the microphone;

$$\cos 2\pi ft \cdot [a(f) \cos 2\pi ft + b(f) \sin 2\pi ft]$$
$$= a(f) \cdot \left[ \tfrac{1}{2} + \tfrac{1}{2} \cos 4\pi ft \right] + \tfrac{1}{2} b(f) \sin 4\pi ft$$

Here $$\frac{a(f)}{2}$$

is the direct current component of the wave (40) and has the same zeroes as $a(f)$ of Equation 33; i.e., has the same instants for which the phase of the delayed wave from the microphone is equal to or $n2\pi$ times the phase of the direct wave. From Equation 39, a count of these zeroes $N_0$, is sufficient to permit $T_2$ to be evaluated.

Figure 7:
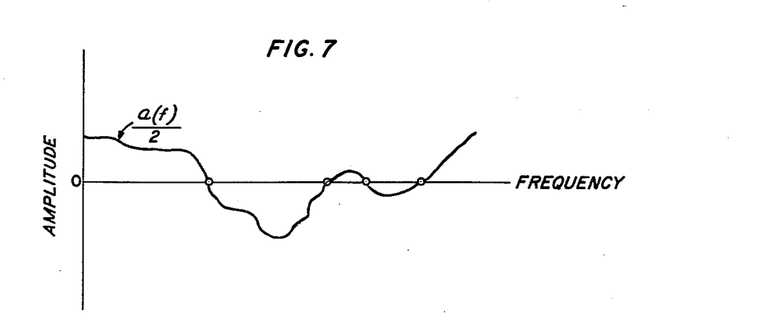
FIG. 7 is a graph helpful in explaining the operation of the apparatus of FIG. 6.

The direct current component of the signal produced by multiplier 69 may be recovered, for example, by passing the signal through low pass filter 70 which effectively removes the double frequency components to produce a signal of the form illustrated in FIG. 7. The zeroes $N_0$, indicated in the figure, may be counted by any means well known in the art. For example, the signal $$\frac{a(f)}{2}$$

may be applied to zero axis counter 71, of known construction, which includes the serially connected combination of clipper 72, differentiator 73 and counter 74. The wave is quantized in clipper 72 to increase the slope of the wave at each axis crossing. The short time-constant of differentiator 73 converts each crossing to a sharp positive-going or negative-going spike which is easily counted by counter 74. Alternatively, the signals from differentiator 73 may be rectified so that the counter need only respond to positive-going spikes. The output of the zero axis counter 71, regardless of its construction, appears at terminal 75 and is evidently equal to $N_0$; it may be used directly in Equation 39 to evaluate the reverberation time $T_2$ of the room 65.

Preferably the measurement of reverberation time is made in a room substantially devoid of extraneous noises. Under some circumstances, however, it may be found advantageous to make the measurement at a time when sound energy from a variety of other sources is present. For example, it may be desired to measure the reverberation time of a room in the presence of an audience. Experience has shown that such a measurement may satisfactorily be made by means of the present invention. Since the low pass filters employed in the circuits described hereinabove effectively pass only a very narrow slice of the sound spectrum of the room, sound energy present within the room from other sources has little effect on the final measurement. Consequently, a continuous check on the acoustic characteristic of the room may be made quickly and easily. Under such circumstances, the sweep frequency signal employed in making the measurement is somewhat masked by auditorium noise or the like and has been found to be of no great concern to a typical audience.

It is obvious from the general principles disclosed herein that numerous substitutions of parts, adaptations and modifications are possible, and that these may be made by one skilled in the art without departing from the spirit and scope of the invention.

What is claimed is:

1. The method of determining the reverberation time of a chamber which comprises the steps of generating in said chamber an acoustic wave whose energy varies as a function of time and measuring the mean increase of phase lag per cycle per second of the resulting wave in propagating from one point to another in said chamber.

2. The method of determining the reverberation time of a chamber which comprises establishing a sound energy wave at at least two different locations in said chamber as the frequency of said wave is varied from a first frequency to a second frequency, counting the number of times that said wave established at a first location coincides in phase with said wave established at another location as said frequency is varied, and dividing said number of phase coincidences by the difference, in cycles per second, between said first and said second frequencies.

3. The method of determining the average time for the decay of residual sound at a point in a room from one intensity level to another which consists in detecting the average rate of change, with respect to frequency, of the phase, as compared with that of a reference source of sound, of the sound pressure detected at said point.

4. The method of determining the average time of decay of residual sound in a room from one level to a lower level comprising, generating in said room a sound wave whose energy varies as a function of time, detecting said sound wave to produce an electrical wave having a parameter that varies as a function of time in correspondence with said energy of said sound wave, sampling said parameter of said electrical wave at two instants representing a phase difference of ninety degrees during each period of the frequency of said time varying sound wave, developing an average value for each sequence of samples, counting the total number of instants for which the average value of samples in one of said sequences is substantially zero when the algebraic sign of the average value of the samples in the other one of said sequences is the same as that of the sign of the derivative of samples in said one sequence, counting the total number of instants for which the average value of the samples in said one sequence is substantially zero when the algebraic sign of the average value of the samples in said other sequence is opposite to the sign of the derivative of samples in said one sequence, measuring the difference of the two counts as the frequency of said sound wave is varied over a preselected range, and dividing said difference of counts by said preselected range.

5. The method of determining the average time of decay of residual sound in a room from one level to a lower level comprising, generating in said room a sound wave whose amplitude varies as a function of time, detecting said sound wave to produce an electrical wave having a parameter that varies as a function of time in correspondence with said sound wave, sampling said parameter of said electrical wave at two instants representing a phase difference of ninety degrees during each period of the frequency of said time varying sound wave, developing an average value for each sample, displaying said samples simultaneously on at least two orthogonal coordinates, and measuring the average change in the total angular displacement of the resultant display as the frequency of said sound wave is varied.

6. Apparatus for measuring the reverberation time of a field which comprises in combination with a source of electrical oscillations, means coupled to said source for varying the frequency of said oscillations from a first frequency to a second frequency, transducer means coupled to said source and energized thereby for introducing sound energy in said field, detector means positioned within said field for translating said sound energy into alternating electrical currents, means coupled to said source of electrical oscillations and to said detector means for producing an electrical signal proportional to the number of phase coincidences occurring between said oscillations and said currents, and means coupled to said measuring means and energized thereby for producing an output signal proportional to the product of said electrical signal produced by said measuring means and a constant that is related inversely to the difference in cycles per second between said first and said second frequencies.

7. Apparatus for measuring the reverberation time of a field which comprises in combination with a source of electrical oscillations, means coupled to said source for varying the frequency of said oscillations over a preassigned frequency range, transducer means coupled to said source and energized by said oscillations for producing sound energy waves in said field, detector means positioned within said field for translating said sound energy waves into alternating electrical currents, and means responsive to said electrical currents for developing a signal proportional to a moment of the squared impulse response of said field, whereby said signal is representative of the reverberation time of said field for said preassigned frequency range.

8. Apparatus as defined in claim 7 wherein said means responsive to said electrical currents develops a signal proportional to the first moment of the squared impulse response of said field.

9. Apparatus as defined in claim 7 wherein said means responsive to said electrical currents develops a signal proportional to the second moment of the squared impulse response of said field.

10. In combination, a source of a carrier wave of variable frequency, means coupled to said source for extracting from said carrier wave a first auxiliary wave of the fundamental frequency of said carrier wave and a second auxiliary wave which is in time-quadrature with said first auxiliary wave and which is of the fundamental frequency of said carrier wave, means coupled to said source for varying the frequency of said carrier wave, transducer means coupled to said source and responsive to said carrier wave for producing sound energy, detector means positioned in coupling proximity with said transducer for translating detected sound energy into an alternating electrical current, multiplying means coupled to said detector means and said source for individually obtaining the products of said alternating electrical current and said first and said second auxiliary waves, means coupled to said multiplying means for averaging each of said product signals, and means coupled to said averaging means for developing an indication of the phase difference between said averaged product signals as the frequency of said carrier wave is varied over a preassigned frequency range.

11. Apparatus as defined in claim 10 wherein said means for extracting from said carrier wave said first and said second auxiliary signals comprises two networks having input points and output points and being proportioned to have, over said preassigned frequency range, impedances that provide like attenuation of a common input signal but which shift the phase of said signal by amounts that differ by ninety degrees from each other, and connections for applying said carrier wave simultaneously to the input points of both of said networks.

12. Apparatus as defined in claim 10 wherein said means for extracting from said carrier wave said first and said second auxiliary signals comprises a first operational amplifier having an input terminal and an output terminal and being proportioned to behave substantially as an integrator, a second operational amplifier having an input terminal and an output terminal and being proportioned to behave substantially as a differentiator, and connections for applying said carrier waves simultaneously to the input terminals of both of said amplifiers.

13. Apparatus as defined in claim 10 wherein said indication-developing means comprises means for simultaneously displaying said averaged product signals along orthogonal coordinates, whereby the phase difference between said product signals may be observed from the locus of the resultant vector as the frequency of said carrier wave is varied.

14. Apparatus as defined in claim 10 wherein said indication-developing means comprises means for differentiating one of said averaged product signals, means coupled to said differentiating means and said averaging means for obtaining the product of said differentiated signal and the other one of said averaged product signals, and means coupled to said last-named means for counting the number of amplitude excursions of said resulting product signal above a preassigned constant value.

15. Apparatus for measuring the time of reverberation of a room which comprises in combination, a source of electrical oscillations, means coupled to said source for varying the frequency of said oscillations over a preassigned frequency range, transducer means positioned in a room, coupled to said source, and energized by said oscillations for producing sound energy waves in said room, detector means positioned in said room for translating said sound energy waves into alternating electrical currents, means coupled to said source for developing from said electrical oscillations two control signals whose periods are each equal to the instantaneous period of said oscillations and whose phases are separated by ninety degrees at all frequencies of said oscillations, means coupled to said detector means and said control signal developing means for multiplying said alternating electrical currents independently by each one of said control signals to produce first and second product signals, means coupled to said multiplying means for averaging said first and said second product signals, means coupled to said averaging means for differentiating said first averaged product signal, means coupled to said differenitating means and said averaging means for multiplying said second averaged product signal by said differentiated signal, and means coupled to said last-named means for counting the number of excursions of the resultant signal above a pre-established constant value.

16. Apparatus for measuring the time of reverberation of a room which comprises in combination, a source of electrical oscillations, means coupled to said source for varying the frequency of said oscillations over a preassigned frequency range, transducer means positioned in a room, coupled to said source, and energized by said oscillations for producing sound energy waves in said room, detector means positioned in said room for translating said sound energy waves into alternating electrical currents, means coupled to said source for developing from said electrical oscillations two control signals whose periods are each equal to the instantaneous period of said oscillations and whose phases are separated by ninety degrees at all frequencies of said oscillations, means coupled to said detector means and said control signal developing means for multiplying said alternating electrical currents independently by each one of said control signals to produce first and second product signals, means coupled to said multiplying means for averaging said first and said second product signals, a display device for displaying signals in a plurality of coordinate directions, means coupled between said averaging means and said display device for applying said first averaged product signal to said device for display in at least one coordinate direction, and means coupled between said averaging means and said display device for applying said second averaged product signal to said device for display in at least one other coordinate direction, said other coordinate direction being displaced by substantially ninety degrees from said first-mentioned direction, whereby the angular displacement of the locus of the resulting display as the frequency of said oscillations is varied over said preassigned range is proportional to the reverberation time of said room.

17. In combination with apparatus as defined in claim 16, an automatic volume control circuit electrically interposed in tandem between said detector means and said multiplying means.

18. Apparatus for measuring the reverberation time of a field which comprises in combination a source of electrical oscillations, means coupled to said source for varying the frequency of said oscillations over a preassigned frequency range, transducer means coupled to said source and energized by said oscillations for producing sound energy waves in said field, detector means positioned within said field for translating said sound energy into alternating electrical currents, means coupled to said source and to said detector means for multiplying said electrical oscillations by said detected alternating electrical currents to produce a product signal, means coupled to said multiplying means for averaging said product signal, and means coupled to said averaging means for developing an indication of the number of times that said averaged product signal is reduced to zero as the frequency of said oscillations is varied.

19. Apparatus as defined in claim 18 wherein said indication-developing means comprises a clipper, a differentiator, and a pulse counter connected in tandem in the order named.

20. The method of determining the reverberation time of a sound field which comprises generating a sound energy wave at a first point in said field, varying the frequency of said sound energy wave from a first frequency to a second frequency, detecting said sound energy wave at a second point in said field, reducing said detected wave to two waves in quadrature with each other, detecting the number of times that one of said quadrature waves is zero as the frequency of said sound energy wave is varied, and dividing said last-mentioned number by the difference in cycles per second between said second frequency and said first frequency.

References Cited in the file of this patent
UNITED STATES PATENTS

| | | |
|---|---|---|
| 1,907,112 | Hopper | May 2, 1933 |
| 2,184,542 | Belar | Dec. 26, 1939 |
| 2,499,593 | Kreuzer et al. | Mar. 7, 1950 |
| 2,837,914 | Caldwell | June 10, 1958 |
| 2,862,200 | Shepherd et al. | Nov. 25, 1958 |